INVENTOR.
R. R. GOINS
BY Hudson & Young
ATTORNEYS

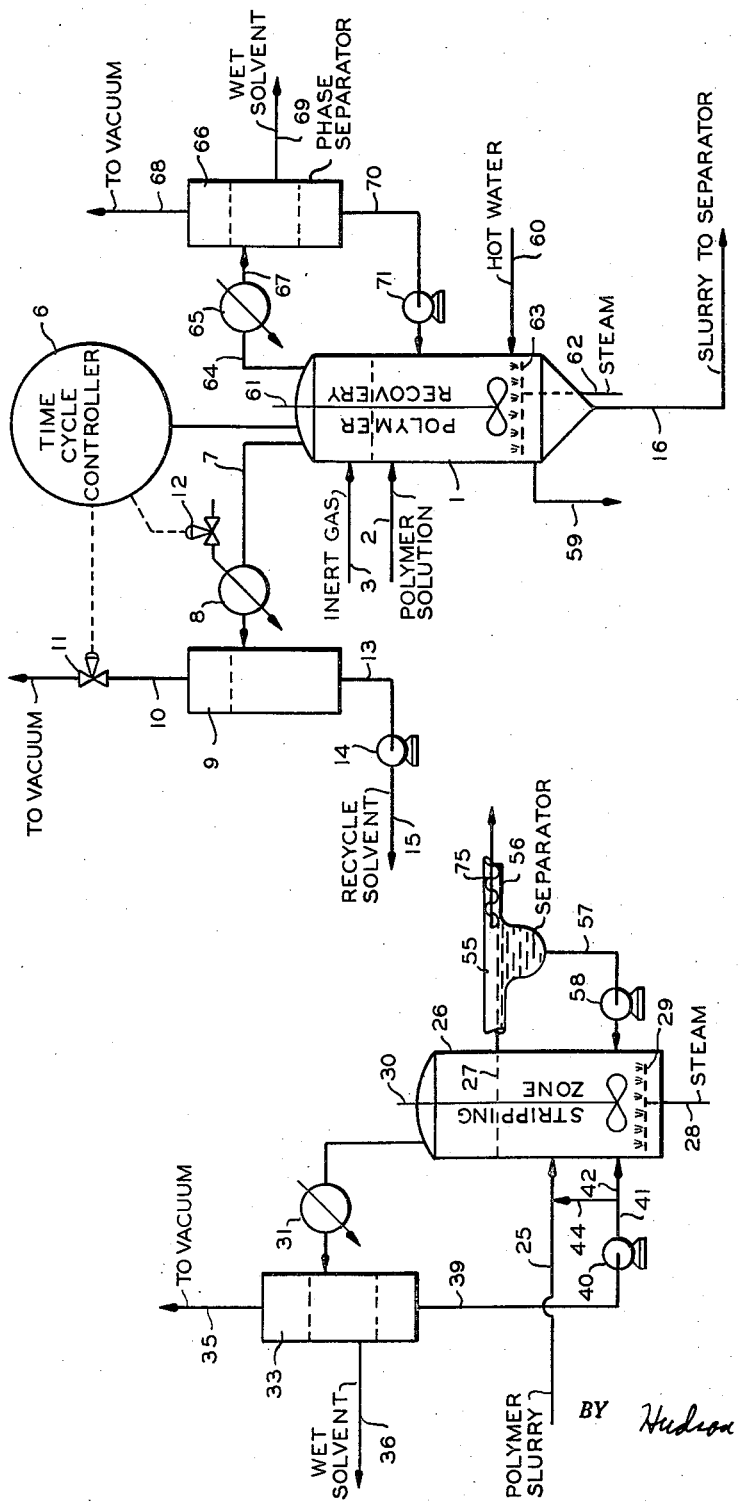

2,964,512
Patented Dec. 13, 1960

2,964,512

POLYMER RECOVERY PROCESS

Robert R. Goins, Bartlesville, Okla., assignor to Phillips Petroleum Company, a corporation of Delaware Filed July 16, 1956, Ser. No. 598,191

7 Claims. (Cl. 260—94.9)

This invention relates to a novel process for the recovery of polymers from a hydrocarbon solution thereof.

The method of this invention is applicable to recovery of polymers from solvents broadly. It has particular application to recovery of solid polymers from the solvent used in the polymerization of 1-olefins. These polymers can be homopolymers or copolymers of one or more 1-olefins.

It has been recently discovered that 1-olefins having a maximum of 8 carbon atoms per molecule and no branching nearer the double bond than the 4-position can be polymerized to solid and semi-solid polymers at low temperatures and pressures as compared with conventional processes for polymerizing these olefins. Such polymerization is generally carried out by first admixing and at least partially dissolving the olefins in a non-polymerizable solvent and carrying out the polymerization in the presence of a catalyst.

In the copending application of Hogan et al., filed December 20, 1954, and having Serial No. 476,306, and now abandoned, and in Serial No. 573,887, filed March 26, 1953, now Patent 2,825,721 a process is disclosed for producing novel polymers of 1-olefins by carrying out the polymerization at a temperature in the range of 100° to 500° F. in the presence of 0.1 to 10 or more weight percent of chromium as chromium oxide, including a substantial proportion of hexavalent chromium associated with at least one porous oxide selected from the group consisting of silica, alumina, zirconia and thoria. A preferred catalyst is one comprising 0.1 to 10 weight percent chromium as the oxide on silica-alumina support such as 90 percent silica—10 percent alumina. This catalyst is ordinarily a highly oxidized catalyst which has been activated by high-temperature treatment under non-reducing conditions and preferably with an oxidizing gas. Olefins, other than 1-olefins as described, are polymerized by the action of this catalyst but many of the resulting polymers are preponderantly normally liquid at least when polymerized under the described conditions. The polymerization is siutably carried out in the liquid phase such as in solution in a hydrocarbon solvent, especially a paraffin or naphthene which is liquid under the polymerizing conditions; however, vapor phase operation or mixed phase operation can be effected. Also, diolefins can be polymerized by the chromium oxide catalyst to produce solid polymers. As has been indicated, this invention is applicable to recovery of polymers from solution broadly and is particularly applicable to recovery of polymer from the solvent as prepared by the above preferred method. However, polymers as prepared by other catalyst systems can be recovered by the method of this invention, e.g. polymers prepared by the organo-metallic catalyst as disclosed by Karl Ziegler in Belgium Patent 533,362, November 16, 1954.

These polymers of 1-olefins have been separated from hydrocarbon solvents by simple vacuum flashing, but this method produces a low bulk density and fibrous material. This material is difficult to handle and is unsuitable for certain uses. For example, when thin films are prepared from such material, it tends to result in an excessive quantity of "fish eyes." These "fish eyes" are believed to be due to difference in crystalline form or possibly due to segregation of material of different molecular weight or both. Regardless of the cause, the film is not homogeneous and is therefore objectionable to the trade. This fibrous material has a bulk density of approximately one pound per cubic foot, is difficult to handle and to dry completely. For example extrusion equipment cannot be successfully operated with such a low density material. Further, the polymer, even if suitable for the intended purpose, still contains an appreciable amount of solvent. Drying of this material is a problem in that the removal of combustible vapors in conventional drying equipment is somewhat hazardous.

In the copending application of Robert A. Findlay, filed June 18, 1956, Serial No. 591,864, a method is described and claimed for recovering polymeric 1-olefins from solvent in relatively high bulk density form. This method comprises cooling the solvent polymer solution at a controlled rate so as to precipitate polymer in the solution. This precipitated polymer is then generally dried and extruded prior to use. Such precipitated polymer will contain large amounts of solvent which presents a fire and health hazard in the drying step. This invention is an improvement on the Findlay application.

An object of this invention is to provide a method of recovering polymeric 1-olefins from solvent solution in relatively high bulk density and substantially free of solvent.

Other objects and advantages of this invention will be apparent to those skilled in the art having been given this disclosure.

According to this invention, polymer in solution is cooled at a rate which causes small homogeneous particles of polymer to precipitate, the polymer thus precipitated is dispersed in hot water of sufficient temperature to evaporate the solvent leaving polymer dispersed in water, and the solvent-free polymer is then dried and recovered.

As previously indicated, the polymeric materials to which this invention is particularly applicable are polymers of 1-olefins. Polymers of 1-olefins containing 2 to 8 carbon atoms and having no branching nearer the double bond than the 4-position have been found in recent years to have superior heat resistance and low temperature properties when polymerized at relatively low temperatures and pressures. The above-identified method of Hogan et al. is one such low temperature-low pressure method. As indicated above, it is preferable to carry out the polymerization in a hydrocarbon solvent. This invention has particular use in recovering the polymer from the solvent.

Examples of the preferred 1-olefins include ethylene, propylene, 1-butene, 1-pentene, 1-hexene, 1-octene, 4-methyl-1-pentene; 4-methyl-1-hexene; 5-ethyl-1-hexene; 6-methyl-1-heptene; 4-ethyl-1-hexene, and the like.

The solvents especially useful in polymerization of the 1-olefins are hydrocarbons and preferably paraffins including cycloparaffins. These diluents include paraffins and cycloparaffins having 3 to 12 carbon atoms per molecule. Any of the paraffins or cycloparaffins which are a solvent for the heavy polymer at the temperature in the polymerization range are suitable. Any hydrocarbon which is relatively inert, non-deleterious, and liquid under the operating conditions of the process can be utilized. Diluents that have been used successfully in the polymerization reaction and are operable in this invention include propane, isobutane, normal pentane, isopentane, isooctane (2,2,4-trimethylpentane), cyclohexane and methylcyclohexane. Unsaturated aliphatic and cyclic hydrocarbons are, in general, not used in the polymerization reaction since they are likely to enter the polymerization reaction. However, any of these hydrocarbons are operable in the present invention.

In the preferred embodiment of this invention, the initial polymer solution concentration is within the range of 1 to 15 percent and will usually be in the range of 3 to 4 percent. The pressure on the cooling zone should be sufficiently high to prevent flashing of solvent thereby causing precipitation of polymer while solution is being introduced to said zone. The rate of cooling will generally be in the range of 1 to 20° F. per minute and preferably in the range of 3 to 15° F. per minute. I prefer to control the cooling rate to within 5 to 8° F. per minute. However, other concentrations and cooling rates will be operable, the important feature being to precipitate polymer by cooling and thereafter introducing the polymer into hot water so as to evaporate the solvent.

This invention will be further described in conjunction with the attached drawings of which:

Figure 2 is a schematic diagram of a batch operation.

Figure 3 is a schematic diagram of one suitable stripping vessel.

Figure 1:
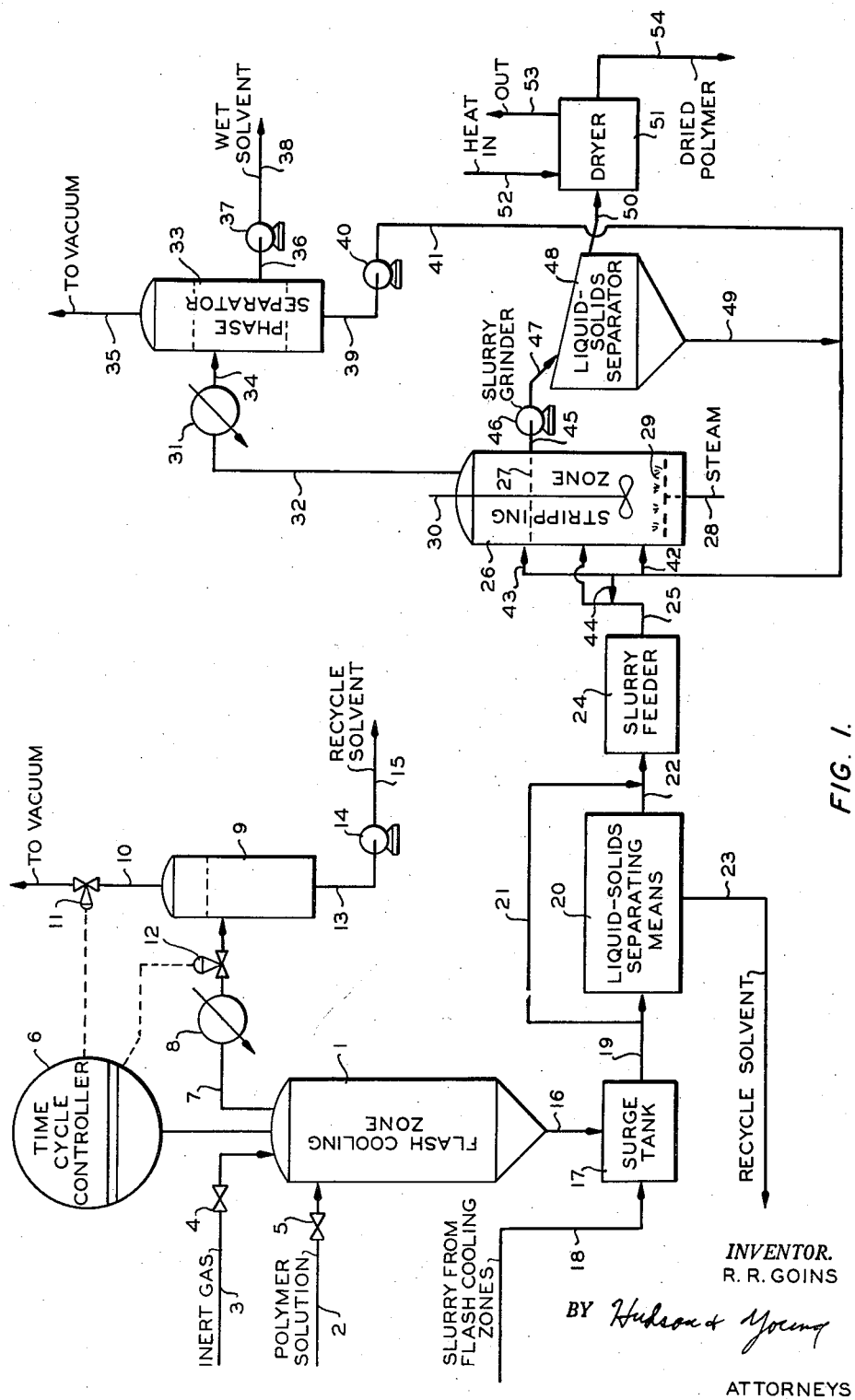
Figure 1 is a schematic block flow diagram of a preferred embodiment of the process.

The description is of a preferred embodiment wherein polymer (polyethylene) of average molecular weight of 40,000–50,000 is recovered from a 3 to 4 percent solution in cyclohexane. The temperatures and pressures are for the given solvent and will necessarily vary for other solvents, it being within the skill of the art to determine those having been given the generic concept.

A hot 3 to 4 percent polymer solution in cyclohexane at a temperature of 230 to 240° F. is fed to cooling zone 1 via conduit 2. During the filling operation, the pressure on zone 1 is maintained at about 18 pounds per square inch gage. When zone 1 is filled to the desired level, valve 5 on polymer solution conduit 2 is closed and the time cycle controller 6 is put into operation. The cyclohexane begins to evaporate and passes overhead via conduit 7, condenser 8 and valve 12 to separator 9 where the resulting liquid and vapor is separated. This control valve 12 can be placed in the overhead conduit 7 as shown in Figure 1 or it can be placed in the coolant conduit of the condenser as shown in Figure 3. The separator 9 is conencted to a vacuum source, not shown, via conduit 10 and through control valve 11. The time controller 6 is operably connected to detect pressure of cooling zone 1 and operably connected to valve 11 or valve 12. That is, the evaporation rate can be controlled by either valves 11 or 12. The temperature of the solution is controlled by the evaporation rate and the rate of pressure reduction can be controlled by any suitable time-cycle controller such as a Foxboro program controller. It will be understood by those skilled in the art that other cooling means can be employed, however, I prefer to use autorefrigeration. Condensed solvent from separator 9 is recycled via conduit 13, pump 14 and conduit 15 to the polymerization zone, not shown, where it is again used.

The time cycle controller is set to control the rate of temperature drop at the desired rate and in this case 5 to 8° F. per minute. The material is held in zone 1 until the polymer is precipitated which in this case will be at a final pressure of 5 to 6 p.s.i.a. and a temperature of 120 to 130° F. However, in some cases a reduction to atmospheric pressure (i.e., temperature 170–180° F.) will suffice.

After the cooling step, the polymer dispersed in solvent is passed via conduit 16 to surge tank 17 by pressure applied by an inert gas admitted to zone 1 from conduit 3 via valve 4. This surge tank can be connected to several such flash cooling zones via conduit 18. By using a plurality of such zones, the remainder of the system can be made to operate continuously, i.e., while one zone is filling, cooling, etc., other zones will be dumping.

The slurry from tank 17 passes via conduit 19 to any suitable liquid-solids separation means 20 such as a screen. It is desirable to remove as much solvent as possible in this zone so as to reduce the load on the evaporator described below. However, this zone is not essential and the slurry can pass directly to the stripping zone via conduits 21 and 22. The solvent from separator 20 is returned to the polymerization zone, not shown, via conduit 23. The solvent-wet polymer passes from separator 20 via conduit 22 to slurry feeder 24. The wet polymer then passes via conduit 25 to stripping zone 26.

The stripping zone 26 is filled to some predetermined level 27 with hot water of about 140° F. or some temperature above the solvent evaporation temperature at the operating pressure. The pressure in this embodiment is about 7.5 p.s.i.a. Steam is admitted to the stripping zone 26 via conduit 28 and nozzles 29. Since the polymer is lighter than water, a stirrer 30 is provided to keep the polymer in dispersion. The solvent is replaced by the water and is evaporated and passes overhead along with some water to condenser 31 via conduit 32. The condensed solvent, water and any non-condensed material then passes via conduit 34 to phase separator 33. The vacuum is maintained on the system via vacuum applied via conduit 35 to separator 33. The solvent is removed from the solvent of said phase separator via conduit 36 and pump 37 and passed to solvent recovery system not shown via conduit 38. The water from separator 33 is removed via conduit 39, pump 40 and conduit 41 and is returned to the stripping zone. This water can be returned directly to the stripping zone either to the liquid phase via conduit 42 or the gaseous phase via conduit 43 or part or all of it can be mixed with polymer slurry in conduit 25 via conduit 44 before being introduced to the stripping zone.

The polymer-water slurry passes via conduit 45, pump 46 and conduit 47 to liquid-solids separator 48. It will be understood by those skilled in the art that polymer grinders or shredders can be used if desired in conduit 45 or 47. This liquid-solids separator can be any suitable separating means, however, a simple screen or skimmer screen is generally used. The water is returned from separator 48 to conduit 41 via conduit 49. The wet polymer then passes via conduit 50 to dryer 51 wherein the moisture is removed. Generally this dryer will be of the warm air type and dry warm air is admitted via conduit 52 and the air picks up moisture and is cooled and is removed via conduit 53. The dried polymer is removed from the dryer via conduit 54. In the present embodiment air of about 250° F. in a Lindberg forced draft dryer will produce polymer of about 98 weight percent solids in about 2–4 hours and further drying can be accomplished by use of an extractor-extruder.

Referring to Figure 2 an alternative polymer recovery system is shown. The stripping zone is the same as that of Figure 1 and the same numerals are used to designate the same features. In this embodiment, polymer slurry passes from zone 26 into separator 55 wherein the polymer floats on top of the water and passes on to the dryer via conduit 56 and screw conveyor 75. Water from the trap passes via conduit 57 and pump 58 back to the stripping zone. Here, again, the water can be returned by tying back into conduit 41 if so desired.

In Figure 3, the flash cooling zone is modified so that both the cooling and recovery can be obtained in one vessel. The operation of the cooling cycle is the same as that described in conjunction with Figure 1 and the same reference numerals are used. After the cooling cycle is completed, most of the solvent is removed via conduit 59, the polymer having first settled. Hot water is admitted to zone 1 via conduit 60 to a predetermined level and agitator 61 is started to cause the polymer which is now floating, to be dispersed. Steam is then admitted via conduit 62 and nozzles 63. The solvent is evaporated and passes overhead with some water vapor via conduit 64 to condenser 65. The condensed material along with some gases pass to separator 66 via conduit 67. The desired pressure is maintained via vacuum system, not shown, via conduit 68. The wet solvent is removed from separator 66 via conduit 69 and the water from separator 66 is returned to the system via conduit 70 and pump 71. After the polymer is stripped, the slurry is then removed via conduit 16 and the system is again ready for a cooling cycle.

Valves, pumps, etc., except as noted, are not shown, it being within the skill of the art to supply same. Numerous modification have been described in conjunction with the description. Many such modifications can be made and will be obvious to those skilled in the art. The important features are the controlled cooling cycle and the injection of the precipitated polymer into water.

A specific embodiment of this invention will now be described. Ethylene is polymerized in cyclohexane by the process of Hogan et al. as described and the major portion of the ethylene is removed by flashing and the catalyst removed by filtration. The solution at 225° F. and comprising 0.02 wt. percent ethylene, 95.92 wt. percent cyclohexane, and 4.06 wt. percent polymer is passed to the flash cooling zone 1 via conduit 2 at the rate of 80,000 pounds per hour. The pressure in this zone is 33 p.s.i.a. initially and the temperature is allowed to drop 7.5° F. per minute until the final temperature is 120° F. and the final pressure is 5.2 p.s.i.a. During this cooling step, cyclohexane is evaporated as is some additional ethylene so that of the 80,000 pounds charged, only 72,500 pounds remain comprising 0.01 wt. percent ethylene, 94.49 wt. percent cyclohexane and 4.5 weight percent polymer. The slurry from the flash cooling zone then passes through a centrifuge wherein a major portion of cyclohexane is removed and 12,700 pounds slurry of the original 80,000 pounds feed remains. This slurry comprises 75 weight percent cyclohexane and 25 weight percent polymer. This material is fed to the stream stripper 26 which operates at 170° F. and atmospheric pressure. The steam rate to this stripper is 6 pounds steam per pound of cyclohexane. A ten percent solids in water slurry then passes from the steam stripper via conduits 45 and 47 to jig screen 48 wherein the slurry is concentrated to 80 percent solids. A small amount of cyclohexane will still be present and is in this example as 0.3 percent based on the weight of polymer (3,170 pounds). The wet polymer is then passed through a forced draft Lindberg dryer wherein the retention time is 3 hours and the air temperature is 250° F. The polymer product contains 99.97 weight percent solids.

Two runs were made illustrating the method of this invention. Polyethylene as prepared by the method of Hogan et al. was precipitated by autorefrigeration as described. In Run No. 1, the slurry was fed into a 400 gallon agitated tank through a ⅜ inch copper tube to below the liquid surface. In Run No. 2, the slurry was sprayed above the liquid by using a Binks F-92-97 spray nozzle. The data are shown in the table.

I claim:
1. A process for recovering a normally solid polymer of an aliphatic 1-olefin hydrocarbon having from 2 to 8 carbon atoms per molecule and no chain branching nearer the double bond than the 4-position from solution in a liquid hydrocarbon selected from the group consisting of paraffins having from 3 to 12 carbon atoms per molecule and naphthenes having from 5 to 6 carbon atoms in a naphthenic ring, which process comprises cooling said solution by vaporizing said hydrocarbon by controlled reduction of pressure whereby the unvaporized solution is cooled at a rate within the range of 1 to 20° F. per minute and the solid polymer is precipitated, dispersing the thus precipitated polymer, together with supernatant hydrocarbon, into water, and vaporizing said hydrocarbon together with water by steam distillation, and producing a dispersion of solid polymer in water.

2. The process according to claim 1 wherein said polymer is a polymer of ethylene.

3. A process according to claim 2 wherein the precipitated polymer is separated from part of the supernatant hydrocarbon prior to the dispersion into water.

4. A process according to claim 2 wherein the water-polymer slurry is passed to a quiescent zone wherein polymer is separated from water by flotation.

5. A process according to claim 2 wherein said hydrocarbon is cyclohexane, said solution initially has a concentration of polymer within the range 1 to 15 weight percent; said solution is initially cooled to a temperature in the range of 220–230° F.; the thus cooled solution is further cooled by said controlled reduction of pressure to a temperature in the range of 170 to 180° F., thereby causing a portion of said polymer to precipitate; a portion of the solvent is separated from the resulting slurry; the remaining slurry is dispersed in water and cyclohexane is vaporized by steam distillation; and said particulate polymer is recovered from the resulting aqueous slurry.

6. The process according to claim 5 wherein the water temperature is about 140° F. during the dispersion and vaporization.

7. A process for recovering a normally solid polymer of an aliphatic 1-olefin hydrocarbon having from 2 to 8 carbon atoms per molecule and no chain branching nearer the double bond than the 4-position from solution in a liquid hydrocarbon selected from the group consisting of paraffins having from 3 to 12 carbon atoms per molecule and naphthenes having from 5 to 6 carbon atoms in a naphthenic ring, which process comprises cooling said solution by vaporizing said hydrocarbon by controlled reduction of pressure whereby the unvaporized solution is cooled at a rate within the range of 1 to 20° F. per minute and the solid polymer is precipitated, continuing the pressure reduction until the pressure is atmospheric, discontinuing said pressure reduction, dispersing the thus precipitated polymer, together with supernatant hydrocarbon, into water, and vaporizing said hydrocarbon together with water by steam distillation, and producing a dispersion of solid polymer in water.

| Run | Slurry Rate, lbs./hr. | Slurry Conc., Percent | Tank Temp., °F. | Water Recycle, g.p.m. | Run in Hrs. | Pounds Product | Description of Product |
|---|---|---|---|---|---|---|---|
| 1 | 334 | 3.0 | 170 | 9.6 | 1.5 | 22 | Pea size to fines. |
| 2 | 540 | 4.0 | 169 | 16.0 | 2.3 | 72 | Mostly fines. |

References Cited in the file of this patent
UNITED STATES PATENTS

| | | |
|---|---|---|
| 2,388,160 | Krase | Oct. 30, 1945 |
| 2,545,144 | Green et al. | Mar. 31, 1951 |
| 2,692,259 | Peters | Oct. 19, 1954 |
| 2,728,758 | Field et al. | Dec. 27, 1955 |
| 2,838,477 | Roelen et al. | June 10, 1958 |